Sept. 11, 1934.   J. M. BOYKOW   1,973,042
GYROSCOPIC PENDULUM
Filed June 20, 1932   2 Sheets-Sheet 2
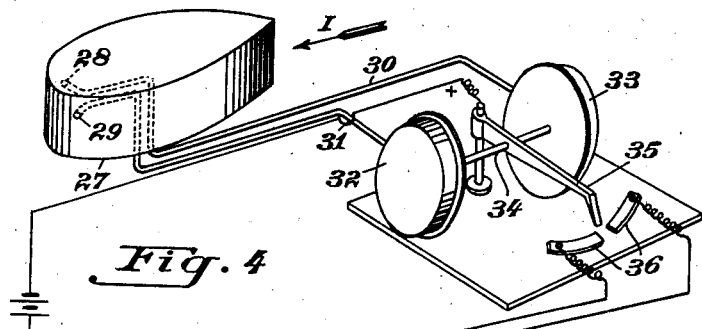
Fig. 4
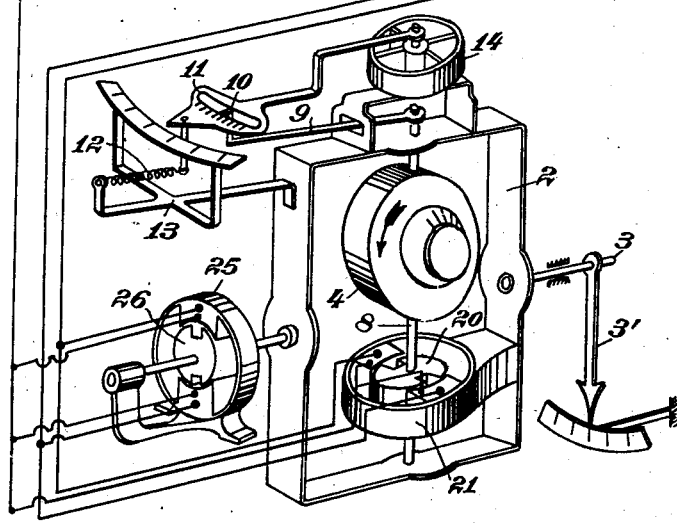
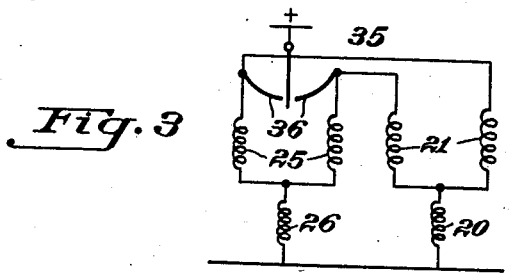
Fig. 3
INVENTOR
JOHANN MARIA BOYKOW
BY
ATTORNEYS.

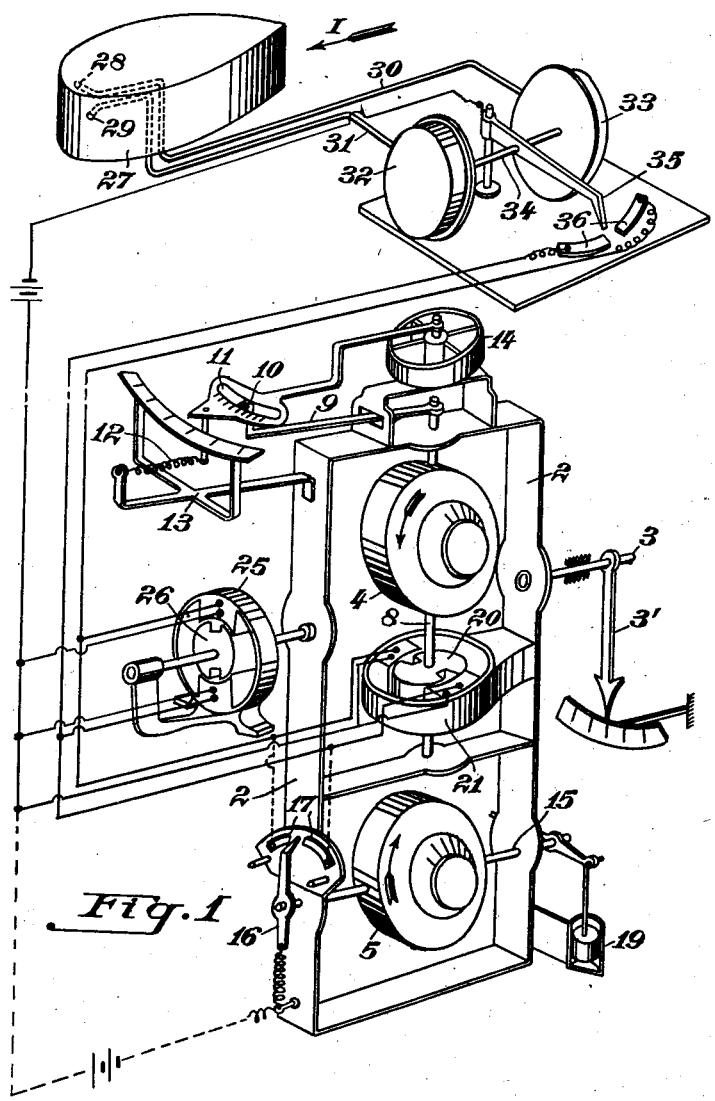

Patented Sept. 11, 1934

1,973,042

UNITED STATES PATENT OFFICE 1,973,042

GYROSCOPIC PENDULUM

Johann Maria Boykow, Berlin-Lichterfelde-West, Germany

Application June 20, 1932, Serial No. 618,294
In Germany June 20, 1931

10 Claims. (Cl. 33—204)

The invention relates to apparatus for indicating the position and direction of travel of airplanes.

More particularly the invention relates to apparatus in the nature of a gyroscopic pendulum for indicating the lateral position of an airplane corresponding with the state of flight and the direction of travel relatively to the ground. An example of such apparatus is disclosed in my U. S. Patent 1,940,387, Dec. 19, 1933. In said patent I have described an apparatus comprising two gyroscopes, one of which is mounted in the pendulum itself with two precession degrees of freedom and has an axis of rotation located laterally to the direction of flight and a vertical precession axis with reference to the pendulum and is damped in its deflections in correspondence with the precession speed. The second gyroscope may likewise be located within the pendulum or also outside the pendulum and its axis of rotation may have any desired direction. This second gyroscope has, however, only a horizontal precession axis, which cooperates with switchgear through which a correction moment with reference to the lateral position of the pendulum may be exerted upon the precession axis of the first pendulum.

In such apparatus it is impossible to prevent the pendulum from assuming an incorrect inclined position in consequence of influences such as excessive friction in the bearings. If the pendulum has assumed such an inclined lateral position, however, it is necessary that the pilot or aviator, when controlling the airplane according to the pendulum as a lateral position indicator, should adjust the airplane in an inclined lateral position. This, in its turn, has the consequence that the airplane will sideslip without the pilot becoming aware of this at first when the visibility is bad.

This phenomenon may be accounted for by the fact that the component of the acceleration of gravity acting in the direction of the inclined position resulting from the inclined position of the airplane acts at first with equal force on the airplane side slipping along an inclined plane, so to say, and upon the pendulum side slipping together with the airplane, so that at the beginning the pendulum remains stationary in relation to the airplane. The more the airplane then approaches the stationary final state in its side slipping lateral motion, the greater becomes the resulting acceleration pressure upon the pendulum. It is obvious that the acceleration of gravity becomes fully effective only in the stationary final state. For this reason the gyroscope mounted in the pendulum will not precess at once when the airplane sideslips. It will deflect only when the transverse speed of the airplane has become so high that the lateral acceleration of the airplane is so strongly reduced by the resistance of the air that the precession pressure of the gyroscope overcomes the resistances. Then also the precession develops gradually only and increasingly with the approach to the stationary final speed of the lateral motion of the airplane.

The invention relates to an additional control of the apparatus described, by a lateral speed indicator in such a way that the improved apparatus will respond even to a very small lateral sideslip of the airplane.

According to the invention the apparatus for this purpose is supplemented by a lateral speed indicator which controls a torque generator which, as soon as a lateral speed predetermined within the range of sensitiveness of the speed indicator develops, exerts a torque on the axis of the pendulum in the same direction as the acceleration of gravity would exert and against which the pendulum is at first more or less insensitive. The more sensitive the speed indicator, the sooner will this torque be exerted upon the pendulum and the sooner will the gyroscope mounted in the pendulum start precessing, so that the pilot may operate the control gear of the airplane in accordance with the precession deflection of this gyroscope. The airplane then passes into a corresponding curved flight so that the second gyroscope responsive to changes in the course of the airplane exerts a correction moment upon the pendulum via a torque generator, whereby the pendulum passes automatically from its inclined position into the true perpendicular position.

The speed indicator for the sideslip of the airplane controls, preferably through an electrical contact system, a swinging coil in a magnetic field mounted on the shaft of the pendulum. It will be readily understood however, that instead of such an electromagnetic torque generator, a hydraulic, pneumatic or other appliance may equally well be employed.

Two embodiments are, by way of example, illustrated in the drawings affixed to this specification.

Figs. 1 and 2 show in perspective view one embodiment,

Fig. 3 is a diagram of connections for the torque generator, and

Fig. 4 shows another embodiment in perspective representation.

Referring to Figs. 1 and 2 of the drawings, the arrow I indicates the direction of flight of the airplane. Parallel to this direction of flight is located on the airplane the spindle 3 about the axis of which the pendulum 2 oscillates. In the pendulum frame 2 are mounted the main gyroscope 4 and the correction gyroscope 5. The main gyroscope has two precession degrees of freedom around its vertical precession axis formed by the spindle 8 and around the axis of the pendulum spindle 3 respectively, the correction gyroscope 5 has only one precession degree of freedom around the axis of the spindle 15 parallel to the pendulum spindle 3. On the precession spindle 8 is mounted an arm or lever 9 with a pointer 10 extending into the recess or slot of a fork 11. The extreme end of the fork 11 is engaged by a retrieving spring 12 tending to maintain the fork in the central position, and attached at its other end to a bracket 13 mounted on the frame 2. The fork 11 is furthermore provided with a damping device 14, which may, for instance, consist of a liquid brake.

The correction gyroscope 5 has only a horizontal precession axis (that of the spindle 15) located in the direction of flight, upon which spindle is mounted a movable contact arm 16 adapted to cooperate with the stationary contacts 17. With the precession spindle 15 is connected a damping device 19 which, like the damping device 14, operates in such a way that the deflection of the gyroscope is proportional to the angular velocity of the spindle 15. The switch 16, 17 may, as in the apparatus described in my prior patent above referred to, serve for the control of the electromagnetic torque generator 20, 21 mounted on the precession spindle 8 of the gyroscope 4. On the spindle 3 of the pendulum 2 there is also mounted a pointer 3' which indicates the lateral inclination of the pendulum on a scale. According to this invention a further electromagnetic torque generator 25, 26 is mounted on the axis 3 of the frame 2.

Outside or away from the gyro pendulum there is mounted upon the airplane, for instance on the supporting surface of the airplane, and in the path of the air current, a speed indicator in the form of a streamline body 27 with lateral nozzles 28 and 29 which communicate with pressure-responsive elements 32 and 33 of the diaphragm type which measure the pressure due to the speed through the air. The diaphragms of the pressure gages are connected by a movable transverse member 34 for shifting the switch arm or lever 35 which cooperates with contact segments 36 of the torque generator 25, 26 mounted on the spindle 3 of the pendulum frame, said segments 36 being also connected with the torque generator 20, 21 mounted on the precession spindle 8 of the gyroscope 4.

The apparatus operates in the following manner. If during the straight-line flight of the airplane the pendulum 2 for some reason or other assumes an incorrect inclination, the pilot banks the airplane in correspondence with the indication of this pendulum. The airplane will at once sideslip so that the air pressure in one of the two nozzles 28 and 29 preponderates over that in the other and the switch arm 35 is moved towards one side or the other. The torque generator 25 is thereby switched on in one direction or the other so that it exerts a torque on the spindle 3 of the pendulum 2. The gyroscope 4 consequently precesses so that the arm 9 is deflected. This arm 9 shows the pilot that he is flying in a curve.

In order to right the airplane again the pilot operates the rudder or other control surface. The gyroscope 5 then precesses, however, and by means of the contact device 16, 17 switches the torque generator 20, 21 on in such a direction that the main gyroscope 4 exerts a correction moment upon the pendulum which returns the pendulum to the true perpendicular position. The pilot then also rights the airplane into the horizontal position, so that the incorrect inclination of the pendulum is rendered harmless.

If the lateral speed indicator also acts in the manner shown on the torque generator 20, 21, it takes over partly or completely the task of the gyroscope 5 according to the strength of the action. The gyroscope 4 then only functions as a curve indicator, if desired.

If in this system of connection a lateral inclination should develop on account of the pendulum 2 taking an inclined position, the arm 35 will also switch on the torque generator 20, 21, and this generator then again exerts a correction torque on the precession spindle 8 of the gyroscope 4. If now the torques of the torque generators 20, 21 and 25, 26 are numerically equal, the pendulum 2 will return to the true perpendicular position without the necessity of the airplane describing a curve. The pilot may thus in this case right the airplane again according to the indication of the pointer 3' without the necessity of deviating from the course.

The improved apparatus is extremely sensitive because even with very small lateral inclinations of the airplane considerable lateral speeds are generated in course of time. An incorrect lateral inclination of the pendulum serving for the indication of the position or attitude of the plane does, however, not develop suddenly but gradually.

The improved apparatus consequently indicates such incorrect lateral inclinations even before they have attained a value worth mentioning. If, for instance, the incorrect inclination of the pendulum and thereby also the lateral inclination of the airplane should increase by 1/32° per second, after the lapse of twenty seconds an incorrect inclination angle of about 0.6° would result. A change of the incorrect inclination of 1/32° per second corresponds, however, with an increase of the acceleration by 0.5 cm/second², i. e. after twenty seconds a lateral speed of $$\frac{0.5}{2} \cdot 400 = 1 m/sec.$$

would be attained, which can be indicated directly by a lateral speed indicator. This means, however, that such a small lateral inclination causes a correction in the manner described, and this correction is made so early that the pendulum cannot exert any effect whatever, due to the friction at its bearings and to the precession friction of the gyroscope in the pendulum.

The apparatus as illustrated in Figs. 1 to 3 may also be simplified by omitting the correction gyroscope 5. This simplified construction is illustrated in Fig. 4 of the drawings. As far as the parts of the apparatus in Fig. 4 are identical with those shown in Figs. 1 and 2 the same reference numerals have been used. A description of these parts is therefore superfluous.

As in the apparatus according to Figs. 1 and 2 of the drawings, the contacts 36 co-operating with the switch arm 35 controlled by the lateral speed indicator 27 are connected with the torque generator 20, 21 and also with the torque generator 25, 26.

If in this case due to an incorrect inclination of the pendulum 2 a lateral motion should develop, the torque generator 20, 21 is by the speed indicator and the diaphragm pressure gauges 32, 33 so connected that the torque produces on the precession axis 8 of the gyroscope 4 a precession of the gyroscope 4 around the spindle 3 correcting the incorrect inclination of the pendulum 2.

Since, however, the correction torque around the spindle 8 may, under certain circumstances, also lead to a precession of the gyroscope 4, the torque generator 25, 26 is preferably in this case also excited. The pendulum then rights itself without the airplane flying in a curve, precisely as in the first described construction of apparatus.

It is possible to prove by calculation on a physical basis that an airplane controlled by the improved apparatus when passing into an undesired and unrecognized curve due to the inclined position of the pendulum is bound to sideslip towards the inside or the outside. If the impulse vector of the gyroscope 4 on the airplane is directed towards the left, the airplane slips towards the outside. If the vector is directed towards the right, the airplane slips towards the inside. The action of the lateral speed indicator on the torque generators 20, 21 and 25, 26 takes place accordingly. From this it follows that the apparatus is operative not only in straight-line flights but also in flights in curves.

It will be readily understood that the improved apparatus may serve not only as an indicating device for the pilot or aviator, but also directly as control transmitter for the servomotor of any suitable kind, such as an electrical hydraulic or pneumatic motor, for controlling the airplane.

Any suitable device or appliance, such as a weathervane, may be employed as the lateral speed indicator or meter.

It will be readily understood that various structural modifications or changes may be made in the apparatus described and shown without departing from the spirit of the invention or the ambit of the appended claims.

I claim as my invention:

1. In an airplane, a pendulum mounted on the airplane with its axis of oscillation parallel to the longitudinal axis of the airplane, a torque generator for applying a torque about said axis of oscillation including a member connected with said pendulum, a controlling circuit for said generator, said circuit including a switch gear, a device responsive to lateral motion of the airplane, and means for operatively connecting said device to said switch gear.

2. A gyroscopic pendulum for airplanes, comprising a spindle, a pendulum frame mounted on said spindle, means for journaling said spindle on the airplane parallel to the longitudinal axis of the airplane, a gyroscope having a horizontal axis of rotation arranged at right angles to the direction of flight and having a vertical precession spindle journaled in said frame, a torque generator including a member mounted on said first-mentioned spindle, a controlling circuit for said torque generator, said circuit including a switch gear, a device responsive to the lateral slip of the airplane, and means for operatively connecting said device to said switch gear.

3. A gyroscopic pendulum for airplanes, comprising a spindle, a pendulum frame mounted on said spindle, means for journaling said spindle on the airplane parallel to the longitudinal axis of the airplane, a gyroscope having a horizontal axis of rotation arranged at right angles to the direction of flight and having a vertical precession spindle journaled in said frame, a torque generator including a member mounted on said vertical precession spindle, a controlling circuit for said torque generator, said circuit including a switch gear, a device of the pressure-difference meter type responsive to the lateral slip of the airplane, said device being located outside said gyroscopic pendulum in the relative wind, and mechanical means for operatively connecting said device to said switch gear.

4. A gyroscopic pendulum for airplanes, comprising a spindle, a pendulum frame mounted on said spindle, means for journaling said spindle on the airplane parallel to the longitudinal axis of the airplane, a gyroscope having a horizontal axis of rotation arranged at right angles to the direction of flight and having a vertical precession spindle journaled in said frame, a torque generator including a member mounted on said vertical precession spindle, a second torque generator including a member mounted on said first-mentioned spindle and connected to said frame, a controlling circuit for said two torque generators, said circuit including a switch gear, a device of the pressure-difference meter type responsive to the lateral slip of the airplane, said device being located outside said gyroscopic pendulum in the relative wind, and means for operatively connecting said device to said switch gear.

5. A gyroscopic pendulum for airplanes, comprising a spindle, a pendulum frame mounted on said spindle, means for journaling said spindle on the airplane parallel to the longitudinal axis of the airplane, a gyroscope having a horizontal axis of rotation arranged at right angles to the direction of flight and having a vertical precession spindle journaled in said frame, a torque generator including a member mounted on said first-mentioned spindle and connected to said frame, a controlling circuit for said torque generator, said circuit including a switch gear, a device responsive to the lateral slip of the airplane, said device being located outside said gyroscopic pendulum in the relative wind, means for operatively connecting said device to said switch gear, a second torque generator mounted on said vertical precession spindle of the gyroscope, another switch gear associated with said circuit and connected with said second torque generator, and a further gyroscope with two degrees of freedom, having a horizontal precession spindle operatively connected with the last-mentioned switch gear, said horizontal precession spindle being parallel to the spindle on which the pendulum frame is mounted.

6. A gyroscopic pendulum for airplanes, comprising a spindle, a pendulum frame mounted on said spindle, means for journaling said spindle on the airplane parallel to the longitudinal axis of the airplane, a gyroscope having a horizontal axis of rotation arranged at right angles to the direction of flight and having a vertical precession spindle journaled in said frame, a torque generator including a member mounted on said first-mentioned spindle and attached to said frame, a controlling circuit for said torque generator, said circuit including a switch gear, a device responsive to the lateral slip of the airplane, said device being located outside said gyroscopic pendulum in the relative wind, means for operatively connecting said device to said switch gear, a second torque generator mounted on said vertical precession spindle of said gyroscope and associated with said circuit, another switch gear associated with said circuit to control said first and said second torque generator, and a further gyroscope with one degree of freedom having a horizontal precession spindle journaled in said frame and operatively connected to said second switch gear, said last-mentioned spindle being parallel to the spindle on which the pendulum frame is mounted.

7. A gyroscopic pendulum for airplanes, comprising a spindle, a frame mounted on said spindle, means for journaling said spindle on the airplane parallel to the longitudinal axis of the airplane, a gyroscope having a vertical precession spindle journaled in said frame, said gyroscope having a horizontal axis of rotation at right angles to the direction of flight, means connected with the vertical precession spindle of said gyroscope for damping the precession of said gyroscope in dependence upon the precession speed, a torque generator mounted on the first-mentioned spindle of the said frame and connected to said frame, a controlling circuit for said torque generator, said circuit including a switch gear, a device responsive to the lateral slip of the airplane, said device being located outside the gyroscopic pendulum in the relative wind, and means for operatively connecting said device to said switch gear.

8. A gyroscopic pendulum for airplanes, comprising a spindle, a frame mounted on said spindle, means for journaling said spindle on the airplane parallel to the longitudinal axis of the airplane, a gyroscope having a vertical precession spindle journaled in said frame, said gyroscope having a horizontal axis of rotation at right angles to the direction of flight, means connected with the vertical precession spindle of said gyroscope for damping the precession of said gyroscope in dependence upon the precession speed, an electromagnetic torque generator mounted on the first-mentioned spindle of said frame and connected to said frame, a controlling circuit for said generator, said circuit including an electric contact device for switching in said torque generator, a nozzle body located outside the gyroscopic pendulum in the relative wind, and provided with two nozzles which stand under equal air pressures only during a straight-line flight, a device having a member movable in response to the difference of the pressures acting upon the nozzles of said body, and mechanical means for transmitting motion from said member to the movable part of said contact device.

9. A gyroscopic pendulum for airplanes, comprising a spindle, a frame mounted on said spindle, means for journaling said spindle on the airplane parallel to the longitudinal axis of the airplane, a gyroscope having a vertical precession spindle journaled in said frame and a horizontal axis of rotation at right angles to the direction of flight, means connected with the vertical precession spindle of said gyroscope for damping the precession of said gyroscope in dependence upon the precession speed, an electromagnet torque generator mounted on the spindle of said frame and connected to said frame, a second torque generator mounted on the vertical precession spindle of the said gyroscope, a controlling circuit for said two torque generators, said circuit including an electric switch gear having a movable contact, a differential pressure gauge comprising a two-nozzle body located in the relative wind in such a way that its two nozzles stand under equal air pressure only during a straight-line flight, and a differential pressure measuring instrument provided with a movable member carrying the movable contact of said electric switch gear.

10. A gyroscopic pendulum for airplanes, comprising a pendulum frame fulcrumed about an axis extending lengthwise of the airplane, a gyroscope supported on said frame to swing about a vertical precession axis and to rotate about a horizontal axis transverse to the airplane, means for applying a correctional torque upon the said pendulum frame, a device responsive to differences of pressures arising when the airplane sideslips, and an operative connection between said device and said torque applying means to vary said torque in response to variations in such differences of pressure.

JOHANN MARIA BOYKOW.